INVENTOR
David Perlman

United States Patent Office 2,841,548
Patented July 1, 1958

2,841,548
ELECTRODE HOLDER
David Perlman, Beaumont, Calif.

Application December 11, 1953, Serial No. 397,569

1 Claim. (Cl. 204—297)

This invention relates to metalizing powder compositions for use in forming a metallic electrode coating stratum on an electrically non-conductive shaped surface of especially shaped body on which a self-supporting metallic structure of a desired precisely conforming shape is to be formed by an electrodeposition process. The invention also relates to electrode holder for supporting an electrode structure with a shaped electrode surface on which a precisely shaped metallic body is to be gained by an electrodeposition in an electrodeposition bath.

It is accordingly among the objects of the invention to provide a novel metalizing composition which, when applied to a shaped surface of an electrically non-conductive structure, such as a tooth impression, will provide such structure with an electric surface stratum on which a thick metallic structure of desired precise conforming shape may be formed by an electrodeposition process.

It is also among the objects of the invention to provide a novel improved and completely foolproof in construction and operation an electrode holder which does not distort the most delicate electrodes during mounting operations and the electroformed dies during the dismounting operations by which an electrode surface may be supported in an electrode position bath for depositing therein a metallic body of desired precise conforming shape.

The foregoing and other objects of the invention will be best understood from the following description of exemplifications thereof, reference being had to the accompanying drawings wherein.

Figure 1:
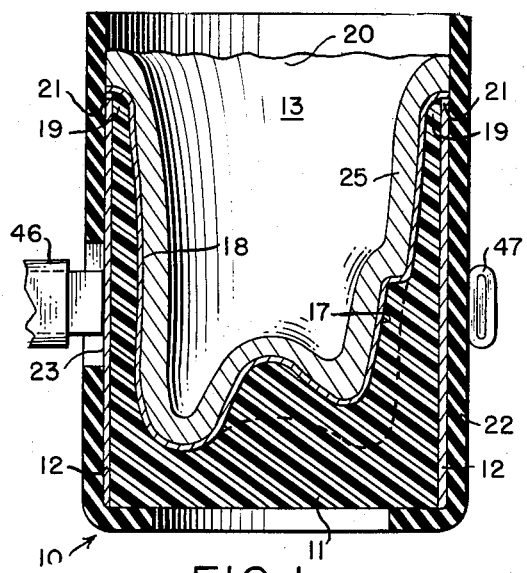
Fig. 1 is a cross-sectional view of a dental impression of a cavity-containing tooth, showing one manner in which it is prepared for the electrodeposition process in accordance with the principles of the invention.

Although the principles of the invention have many other applications, they will be described in connection with the preparation of a die pattern of a cavity-containing tooth used for producing a gold inlay that will fit precisely the tooth cavity in such manner as to reduce the likelihood of further damage of the tooth, or loosening or loss of the inlay.

The present invention was evolved in an effort to avoid difficulties connected with the production of inlays for tooth cavities by what is known as the "indirect method," widely used by the dental profession. In such indirect method, the dentist makes a tooth impression of the whole tooth and its cavity in a warmed-up plastic impression compound held in a thin band of copper or like metal. From this tooth impression a duplicate or pattern of the impaired tooth, known as the "tooth die" is prepared. From the so obtained tooth die pattern there is produced, with similar impression material, a pattern of the tooth cavity conforming to the shape of the actual tooth cavity as precisely as possible. The so-obtained tooth-cavity pattern is invested with an investment material to produce a corresponding cavity mold. After solidifying the cavity mold, the usually wax-like impression material of the cavity pattern is removed, as by melting and burning it out; and the obtained investment cavity mold is used for casting therein the gold inlay which has to have the desired shape fitting precisely the tooth cavity.

Various compounds are used for making such tooth impressions, to-wit, wax compounds, rubberized compounds, hydrocolloid compounds, plaster of Paris, and the like. Because of their ability to conform precisely to the complicated shape of the tooth cavity, most practically used impression compounds are made of electrically non-conductive thermoplastic compounds, such as wax compounds. In order to produce from such tooth impression a precise metallic die pattern of the tooth, it is essential that the exterior shape of the tooth die pattern be formed along the inner surface of the tooth impression cavity by an electrodeposition process. This in turn requires that the complicated cavity surface of the tooth impression be first surfaced with a thin electrically-conductive metallic coating of minute thickness and capable of serving as a base electrode for electrodeposition thereon of a relatively thick and mechanically strong shell-like surface layer of metal that will serve as the exterior of the desired tooth die pattern.

Unless such tooth die pattern conforms with precise accuracy to the tooth with its cavity, no properly fitting inlay can be produced. In other words, the tooth die pattern must conform with precision accuracy to the shape of the tooth having the cavity which is to be filled, in order to assure that the gold inlay produced therefrom fits the tooth cavity in a perfect manner and will stay therein for many years. If the gold inlay does not fit the tooth cavity with precision accuracy, the inlay will either fall out, or additional decay of the tooth will develop along the marginal border lines of the inlay, necessitating replacement with a larger inlay if the tooth still remains in repairable condition. In many cases, the resulting decay renders the tooth irrepairable, and necessitates its extraction.

Prior to the present invention, it was extremely difficult to obtain by electrodeposition a self-sustaining outer surface layer for the tooth die pattern, having an exterior shape conforming with precision accuracy to the tooth and its cavity. As a result, a great many tooth cavity inlays produced by available techniques fitted only loosely into the tooth cavity, and at times they were also distorted from their desired properly fitting shape. In most cases, the inlays were under sized by about .003 to .010 inch, or even more. Such trouble-breeding undersized inlays result indirectly from the fact that the outer tooth die pattern layer, obtained by the electrodeposition process, was also undersized because of the excessive thickness and non-uniformity of the metallic surface coating applied to the tooth impression on which the surface shell of the tooth die pattern had to be electrodeposited.

For making the metallic surface coating by the prior-art practice, a moisture coating having adherent properties is first applied to the cavity surface of the plastic tooth impression. A brush is then used for applying to the adherent moisture coating a copper or bronze powder, and an effort is made to distribute the metal powder uniformly over the entire moistened cavity surface of the plastic tooth impression, without damaging its shape. The adherent moisture composition used in such coating procedure comprised oils, glycerine, or the like. With such prior-art technique, it was extremely difficult to form an electro-conductive cavity coating of a thickness less than about .001 inch, and in many cases the thickness of the metallic base coating so formed, varied as much as up to .005 inch.

In instances where a graphite coating was applied to the interior cavity surface of such plastic tooth impression, similar difficulties are encountered. Thus, in using colloidal graphite as a coating substance, a quantity of water is admixed thereto in order to thin it and bring it to a form in which it may be applied by a brush as a thin coating to the interior cavity surface of the tooth impression. This results in a surface coating of graphite which is of objectionable thickness, and which makes it impossible to produce by the electrodeposition process the outer layer formation of a tooth die conforming accurately to the original tooth in all the details thereof. Graphite coating is also objectionable for practical reasons, because the exterior of the electro-formed shell formed therewith, is black.

As a result of extensive research, I have found that the foregoing difficulties may be overcome by using as a coating composition for metallizing the cavity surface of plastic tooth compositions, commercially available silver powders, of the type used for painting chinaware or the like, combined with a critical proportion of stearic acid into a dry silver coating powder; that such silver powder composition may be readily applied in dry form, with a fine-hair brush, such as a sable-hair brush, to the interior cavity surface of a plastic tooth impression to form thereon an electrically conductive surface metallic electrode coating of a thickness which is only a fraction of a thousandth of an inch, such as .00001 inch, or even less; and that such minutely thin silver coating of the invention makes possible the electrodeposition thereon of a relatively thick layer of metal such as copper, having an exterior shape conforming with precise accuracy to all details of the internal cavity surface of the plastic tooth impression. The commercially available silver powders suitable for the composition of the invention are usually composed of flake-like particles which will pass through a screen of from 250 to 500 mesh, and have a particle size of the order of several microns in diameter, and a fraction of a micron in thickness, which are so light that when stirred by a brush will float in the air.

To give the silver powder particles the desired characteristics which cause it to adhere in the form of a coating of minute thickness to the interior cavity surface of an impression, I found it essential to combine with it, stearic acid in a critical proportion between about 3% to 4.5% by weight. Such silver powder composition of the invention remains dry, and when stirred with a brush, will likewise float in the air.

Such silver powder combined with stearic acid in the critical proportions of the invention, greatly simplifies the process of forming a minutely thin, uniform electrode coating along the interior cavity surface of a plastic tooth impression. A brush is dipped in the dry silver powder composition and the brush with the silver powder thereon is applied to the cavity surface of the plastic tooth impression with a burnishing movement. A single application of such silver powder compound is sufficient to form on the entire interior cavity surface of a plastic tooth impression, a continuous electrically-conductive metallic coating that will operate as a very effective electrode base for building up thereon by electroformation a self-sustaining, shell-like metal layer of substantial thickness having an exterior shape conforming with precision accuracy to the intricate details of the cavity surface of the plastic tooth impression. The silver metal coating so formed is of such minute thickness that it is not visible when seen in cross-section. However, its light-reflecting properties make it visible along the surface of the plastic tooth impression to which it was applied.

An unskilled worker is able to perform such coating operation as long as he does not leave any surface portions of the cavity without a visible coating. In other words, once a visible coating is produced on the interior cavity surface of the impression, the coating will have the desired thickness and electrical conductivity required for depositing thereon a solid layer of metal by an electro-forming operation.

Such silver coatings may be readily produced with silver powder containing stearic acid in the proportion of 3.5% to 4.5% by weight, and also when the proportion of stearic acid is decreased to about 3%, or increased to about 4.5%. If the proportion of stearic acid is increased about 4.5% to about 5%, the silver powder composition becomes quite pasty and cannot be applied as readily in an extremely thin layer to the cavity surface of a plastic impression so as to leave thereon a substantially uniform thin coating of the silver powder. If the proportion of the stearic acid in the silver powder is reduced from 3% to about 2.5%, the silver powder will not as readily adhere to the cavity surface to which it is applied by a brush and much greater effort and care is required to deposit on the cavity surface of a plastic impression a coating covering all surfaces portions thereof with the minimum coating thickness for assuring a good electro-forming process in depositing thereon a metal layer of substantial thickness throughout the desired area thereof.

Fine silver powder produced by any known process may be readily combined with stearic acid in desired proportion. This may be done, for example, by the following procedure:

Stearic acid of the desired weight and proportion is dissolved in a suitable volatile organic liquid solvent such as mineral spirits, or other volatile petroleum product. Silver powder in the required proportion of weight is then added to the solution of stearic acid, and the stearic acid and the silver powder are intermixed while in the solution. Thereupon, the solvent is removed, as by evaporation under vacuum, leaving the silver powder combined and coated with the desired proportion of stearic acid, ready for use in accordance with the principles of the invention.

When treated in the manner described herein, the individual silver powder particles are provided on their entire exposed surfaces with a thin coating film or stratum of stearic acid, and the so coated silver powder particles are very effective in forming a minutely thin electrode-base coating on a shaped plastic body, such as a plastic tooth impression, on which a self-supporting metal structure of desired precise shape conforming to the shape of the coated plastic body surface is to be formed by electrodeposition process.

There will now be described one practical way of making a tooth die pattern in accordance with the principles of the invention.

Figures 3, 4, 5:
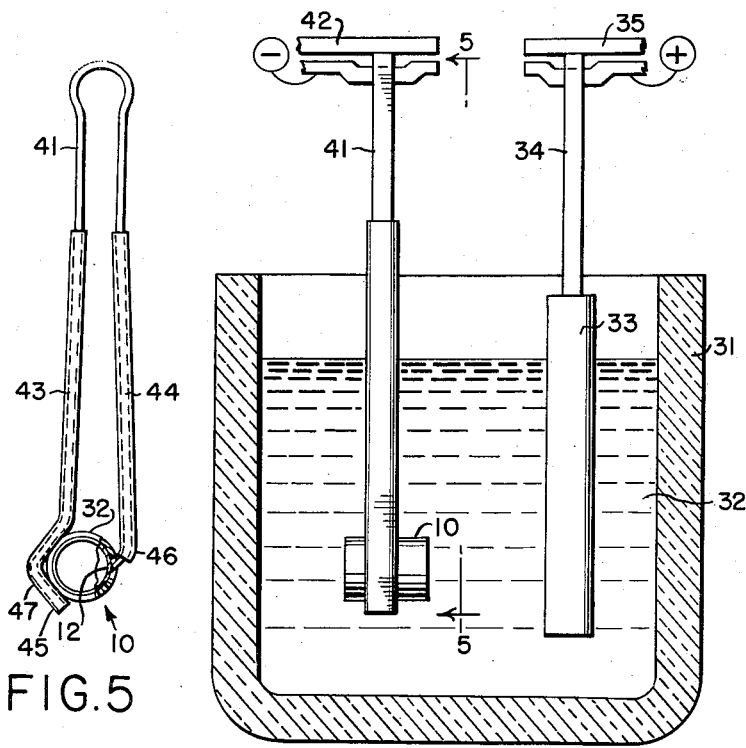
Fig. 3 is a completed tooth die pattern made with plated shell of Fig. 2.
Fig. 4 is one form of plating equipment including an electrode holder of the invention.
Fig. 5 is a side view of the holder shown in Fig. 4.

Referring to Fig. 1, a body 11 of conventional thermoplastic impression material, such as a wax-like impression compound, retained within a generally tubular band 12 of metal such as copper, has formed therein a pattern cavity 13 with an inner cavity surface 17 conforming with precise acuracy to the shape of a tooth having the same shape as the tooth die pattern 14 shown in Fig. 3. The pattern cavity 13 is formed in the band-enclosed impression material 11 by heating the material in a conventional way, for instance over an alcohol burner flame, whereupon the dentist presses it over the tooth, removing it after first chilling with water. As indicated in Figs. 1 and 3, the tooth in question and its tooth die 14 has a cavity 15 in which is to be fitted an inlay of gold cemented thereto by a very thin interface of cement.

To remove any oil left on the inner cavity surface 17 of the impression body 11 by the tooth (to which it was previously applied to permit easy removal of the impression), the impression body, with the cavity surface 17 formed therein, is washed with water and soap and dried after rinsing. The thoroughly dried impression body 11 and surrounding band 12 are then ready for coating the interior cavity 17. The silver coating composition of the invention is then applied to the cavity surface 17 with a brush, using a burnishing motion to form the silver electrode coating 18. The silver coating 18 is shown in exaggerated form for the sake of clarity, although its thickness is so minute that it is actually invisible in cross-section, and is observable only by a change in light-reflectivity of the cavity surface portions to which it is applied. Thereupon the exterior of the metallic band 12 has applied thereto an outer electronically-non-conductive stop coating layer 22, of sheet wax, for instance.

As seen in Fig. 1, the silver coating 18 is also applied to the edge portions 19 of the impression bordering the opening 20 of the impression cavity 13, for assuring that the silver surface coating 18 of the impression cavity 13 is electrically joined to the adjacent border edges 21 of the metal band housing 12. To provide a terminal connection to the silver coating 18 of the cavity surface 17, a small section of the outer wax coating 22 is removed to provide an exposed terminal portion 23 of the band 12 through which the silver coating 18 is connected to the plating circuit. Over the interior surface of the silver coating 18 of the plastic tooth impression 11 is then deposited by an electrodeposition process, an additional layer 25 of a metal such as copper, so as to form a self-sustaining metal shell constituting the exterior shape of the tooth die 14 conforming with precise accuracy to all the intricate details of the tooth including its tooth cavity.

Figs. 4 and 5 show in partially diagrammatic form how the electrodeposition process is carried on. In a vessel 31 containing the electrolyte 32, is immersed an anode electrode 33, of copper, for instance, suitably supported as by a copper wire 34 by the terminal support 35 connected to the positive terminal of a D. C. source of plating energy, indicated by the (+) sign. The silver-coated tooth impression shown in Fig. 1 and generally designated 10, is held within the electrolyte 32 by a holder 41 carried on a metallic support 42 connected to the negative terminal of the D. C. plating energy source, indicated by the (—) sign.

The electrode holder 41 for holding the silver coated impression electrode within the plating bath is of special improved design and foolproof construction and operation to assure a good electric contact connection to the metal band 12 of the impression 11 without subjecting the delicate impression unit 10 to excessive forces that would result in its slightest distortion in handling incident to the plating process. As shown in Figs. 4 and 5, the holder is made of a strip of springy metal, namely resistant to the destructive action of electrolyte stainless steel, bent into a long U-shape and having two arms 43, 44, biased to flex their ends 45, 46 towards each other. The arm end 45 of the longer holder 41 is bent to form an angular seating portion shaped to grip and seat a portion of the specially shaped tubular impression unit 10 placed therein. The shorter arm end 46 of the holder 41 is bent to form a finger tip terminating approximately opposite the center of the vertex 47 of the angular seating portion 45 of the opposite arm the terminating end of the said finger tip has no insulation.

The finger tip 46 of the bare holder arm 44 is shaped to fit into the recess of the outer insulating coating 22 of the impression unit 10 to make an electric contact connection with the exposed terminal portion 23 of the metallic housing 12 of the impression unit 10. The other portions of the holder arm 44 extending from the electric contacting tip 46 to a level above the highest level of the electrolyte in which it is immersed, and the entire corresponding length of the other holder arm 43, are coated with a cemented on coating of resistant to the destructive action of electrolyte and other elements electrically insulating Vinylite tubing or the like which prevents conduction of electricity there-across.

Figure 2:
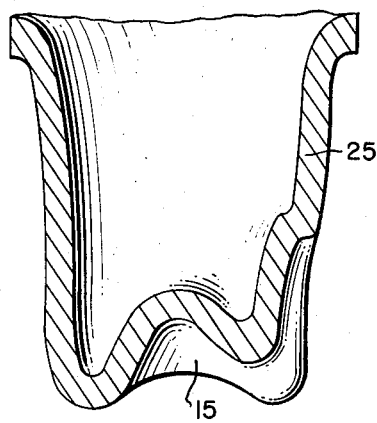
Fig. 2 is a cross-sectional view similar to Fig. 1, showing the self-sustaining metal shell formed by the electrodeposition process on a shaped metallic electrode coating of minute thickness, in accordance with the principles of the invention.

The plated outer tooth shell 25 produced by the plating process described above, after having removed therefrom the impression material 11 and the band 12, has the form shown in Fig. 2. The relatively rigid hollow electroplated shell is then filled with a readily fusible metal such as Malotte's metal, by placing it in a suitable form and pouring the molten metal into the cavity of the shell 25 to provide it with an extension 26. Fig. 3 shows the die pattern in the form in which it is used by dental technicians in the further process of making the gold inlay from the cavity 15 in the die pattern 14 conforming in exact detail to the intricate shape of the tooth which is to be repaired.

The dry silver powder composition of the invention will also form a very effective thin electrode-base coating if applied to the cavity surface of a plastic tooth impression of the type shown in Fig. 1 after first moistening it with a suitable moistening liquid, which does not detrimentally affect the impression compound and is not a solvent therefor. Pure alcohol having dissolved therein a minute fraction of stearic acid such as 5 to 12 grams stearic acid in 32 fluid ounces of alcohol is a satisfactory moistening liquid for this purpose.

According to a further phase of the invention, silver powder composition of the type described above, but combined with stearic acid in proportions within the range of about 5% to 7%, to form a silver powder paste, is suspended in a volatile organic solvent, which does not readily mix with the orginal solvent by which the stearic acid was originally combined with the silver powder, to produce a volatile liquid suspension of the silver powder composition containing 5% to 7% of stearic acid. According to the invention such liquid suspension holding suspended a silver powder composition containing about 5% to 7% stearic acid, when applied as with a brush, to the surface of an object, will form thereon a desired thin continuous electrode coating which is effective as a surface electrode for electro-forming thereon a strong metal object of desired special shape, such as the outer shell of a tooth die pattern, a specially shaped wave guide or the like. In particular I have found that when such silver powder is combined, in a mineral spirit solution, with stearic acid in a proportion between about 5% to 7%, it will, when dispersed in alcohol, form a liquid suspension of silver powder containing the previously added stearic acid and that such liquid powder suspension remains stable for the short time required for applying it as a coating to surfaces which are to be coated, such as a dental impression cavity surface. When such liquid silver powder suspension is applied with a brush to a surface to be coated, the silver powder composition will, after evaporation of the alcohol, form on the coated surface an extremely thin continuous silver coating having a thickness of only a fraction of a thousandth of an inch, such as .0005 to .0001 inch or even less, which forms a good electrode base for the electrodeposition process.

I have found that in making liquid suspensions of silver powder of the type described above, it is desirable to add a minute quantity of stearic acid to the alcohol before dispersing therein the silver powder composition containing 5% to 7% stearic acid. There will now be described one practical example of preparing a liquid suspension of such silver composition of the invention.

Silver powder is combined with 5% to 7% stearic acid in the manner described above in connection with the preparation of dry silver powder composition of the invention. A suspension liquid is prepared by dissolving in 100% pure alcohol stearic acid in the proportion of 32 fluid ounces of alcohol and 5 to 12 grams stearic acid. One part of the prepared silver powder composition is then placed in two parts of the alcohol solution, all parts by weight. By stirring the mixture of alcohol and silver powder composition, the silver particles will become dispersed in the liquid and remain suspended therein for a fairly long period, the powder settling gradually and remaining in partial suspension for a long time. Thus it will take several days before the silver powder composition will settle to the bottom of the container holding the liquid dispersion.

Such liquid dispersion of silver powder may be applied as a coating to cavity surfaces of an impression of the type shown in Fig. 1, by a brush. In applying the liquid silver suspension to the surface, good results are obtained by proceeding as follows: After shaking the bottle so that some of the liquid suspension touches the inner surface of the bottle cap, the cap is removed with a thin deposit of the liquid powder suspension on its inner surface. The brush is applied with a mopping action to the inner surface of the bottle cap holding the liquid powder deposit, for picking it up therefrom. The brush holding the liquid powder deposit is then applied with a burnishing action to the cavity of the plastic impression which is to be coated with the powder, followed by a light retouching motion as part of a continuous single operation, which in the case of most dental impressions requires not more than a few seconds. The deposited liquid evaporates at high rate leaving on the cavity surface of the impression a silver coating having a thickness of less than a fraction of a thousandth of an inch, such as .0005 to .0001 inch or even less.

The invention thus provides a silver powder composition for applying to a shaped surface of an electrically non-conductive body, such as a plastic tooth impression, having thereon minute characteristic details, and forming thereon a continuous metallic coating stratum which forms a surface electrode having an overall thickness of at most about 0.0003 inch, said silver powder composition consisting essentially of dry silver powder and 5% to 7% stearic acid by weight, the particle size of the dry silver powder being small enough so that it floats in the air when stirred by a brush and the said stearic acid being present on the exposed surface of said silver powder particles in the form of a thin stratum of a thickness of at least 0.0005 inch and up to 0.0001 inch, and even up to 0.00015 inch.

I have found, also, that a fine silver powder of the type described above when combined with 5% to 7% of stearic acid in the manner described above, will form a silver powder paste which is of great practical value, for use as a metallizing composition and filler to fill in minute scratches or the like that at times require filling. Such silver powder paste permits ready filling and retouching of scratches in plastic tooth impressions or the like to give them a smooth surface required for producing therewith the desired strong electro-formed metal structure.

It will be apparent to those skilled in the art that the novel principles of the invention disclosed herein in connection with specific exemplifications thereof will suggest various other modifications and applications of the same. It is accordingly desired that in construing the breadth of the appended claim that it shall not be limited to the specific exemplifications of the invention described herein.

This application is a continuation-in-part of application Serial No. 91,943, filed May 7, 1949, now Patent No. 2,683,670.

I claim:

In an improved electrode holder for supporting of a dental impression electrode in an electrolyte during an electro-deposition process, a generally long U-shaped strip of stainless steel spring metal, resistant to the destructive action of electrolyte and other elements, said U-shaped strip having two facing arms, one longer than the other, said arms being biased to flex their ends very lightly into holding engagement with a dental impression electrode held between them, the major portion of each arm having cemented thereto an electrically insulating vinyl resin coating, resistant to the destructive action of electrolyte and other elements, the said longer arm end being shaped to form a generally wide V seat portion having two angularly bent strip portions for seating one side of the dental impression electrode therein, the said shorter arm end having a short portion bent to form a finger tip having a bare metallic end for projecting toward the vertex junction of the said V bent seat portion for simultaneous holding of the dental impression electrode and for making an electro-conductive contact with the said dental impression electrode.

References Cited in the file of this patent

UNITED STATES PATENTS

| | | |
|---|---|---|
| 2,248,718 | Owen | July 8, 1941 |
| 2,349,908 | La Motte | May 30, 1944 |
| 2,423,714 | Leonard | July 8, 1947 |
| 2,505,212 | Schneider | Apr. 25, 1950 |
| 2,522,538 | Rethwisch | Sept. 19, 1950 |
| 2,525,301 | Knoll | Oct. 10, 1950 |

FOREIGN PATENTS

| | | |
|---|---|---|
| 28,506 | Great Britain | Dec. 18, 1911 |

OTHER REFERENCES

"Scientific Materials Blue Book" (1919), page 142.